United States Patent
Kamiyama et al.

(10) Patent No.: US 9,309,816 B2
(45) Date of Patent: Apr. 12, 2016

(54) VARIABLE COMPRESSION RATIO V-TYPE INTERNAL COMBUSTION ENGINE

(75) Inventors: Eiichi Kamiyama, Mishima (JP); Manabu Tateno, Shizuoka (JP); Naoto Hisaminato, Susono (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 954 days.

(21) Appl. No.: 13/514,058

(22) PCT Filed: Dec. 16, 2009

(86) PCT No.: PCT/JP2009/071364
§ 371 (c)(1),
(2), (4) Date: Jun. 6, 2012

(87) PCT Pub. No.: WO2011/074130
PCT Pub. Date: Jun. 23, 2011

(65) Prior Publication Data
US 2012/0316759 A1 Dec. 13, 2012

(51) Int. Cl.
G06F 7/00 (2006.01)
G06F 17/00 (2006.01)
F02D 15/04 (2006.01)
F02B 75/22 (2006.01)
(Continued)

(52) U.S. Cl.
CPC .............. F02D 15/04 (2013.01); F02B 75/041 (2013.01); F02B 75/22 (2013.01); F02D 13/0234 (2013.01); F02D 13/0269 (2013.01); Y02T 10/142 (2013.01)

(58) Field of Classification Search
CPC ........ F02B 75/22; F02B 75/041; F02D 15/04; F02D 13/0234

USPC ................ 123/54.4, 48 R, 48 C, 90.15, 78 C; 701/105
See application file for complete search history.

(56) References Cited

U.S. PATENT DOCUMENTS 4,870,929 A * 10/1989 Macier et al. ............... 123/78 R
6,286,482 B1 * 9/2001 Flynn et al. .................. 123/435
6,848,422 B2 * 2/2005 Hashizume et al. ..... 123/406.29
(Continued)

FOREIGN PATENT DOCUMENTS

JP 9-195843 7/1997
JP 10-141097 5/1998
(Continued)

OTHER PUBLICATIONS

International Search Report in International Application No. PCT/JP2009/071364; Mailing Date: Feb. 23, 2010.

*Primary Examiner* — Mahmoud Gimie
*Assistant Examiner* — David Hamaoui
(74) *Attorney, Agent, or Firm* — Finnegan, Henderson, Farabow, Garrett & Dunner, LLP (57) ABSTRACT

The present variable compression ratio V-type internal combustion engine is a variable compression ratio V-type internal combustion engine which joins cylinder blocks of two cylinder groups and makes the joined cylinder block move relatively to a crankcase, wherein at each relative movement position of the joined cylinder block, the intake valve closing timings of the cylinders are controlled so that the actual compression ratios of the two cylinder groups become equal and thus the temperature difference and pressure difference in the cylinders at top dead center between the two cylinder groups are reduced.

6 Claims, 3 Drawing Sheets (51) Int. Cl.
  *F02D 13/02*  (2006.01)
  *F02B 75/04*  (2006.01)

(56) References Cited

U.S. PATENT DOCUMENTS 7,328,673 B2 *  2/2008  Kawamura ................. 123/90.15
7,726,281 B2 *  6/2010  Buslepp ................ F02D 35/023
                                                      123/406.22
8,671,896 B2 *  3/2014  Hisaminato et al. ......... 123/54.4
8,701,606 B2 *  4/2014  Tateno ........................ 123/78 C
8,985,070 B2 *  3/2015  Tateno et al. ................ 123/48 B

FOREIGN PATENT DOCUMENTS

| | | |
|---|---|---|
| JP | 2004-92452 | 3/2004 |
| JP | 2005-113743 | 4/2005 |
| JP | 2007-285132 | 11/2007 |
| JP | 2008-69720 | 3/2008 |

* cited by examiner

VARIABLE COMPRESSION RATIO V-TYPE INTERNAL COMBUSTION ENGINE

CROSS-REFERENCE TO RELATED APPLICATIONS

This application is a national phase application of International Application No. PCT/JP2009/071364, filed Dec. 16, 2009, the content of which is incorporated herein by reference.

TECHNICAL FIELD

The present invention relates to a variable compression ratio V-type internal combustion engine.

BACKGROUND ART

To raise the heat efficiency, it is effective to raise the mechanical compression ratio ((top dead center cylinder volume+stroke volume)/top dead center cylinder volume) to raise the expansion ratio. However, if raising the mechanical compression ratio at the time of engine high load, the temperature and pressure inside of the cylinders at the ignition timing rise, so knocking easily occurs. Due to this, it is preferable to raise the mechanical compression ratio only at the time of engine low load operation where knocking is hard to occur. For this, it is known to make the cylinder block and the crankcase move relatively to each other to change the distance between the cylinder block and the crankshaft so as to make the mechanical compression ratio variable.

In a V-type internal combustion engine, it has been proposed to make the cylinder block parts of the two cylinder groups move relatively to the crankcase separately along the cylinder centerlines of the cylinder groups, but it is difficult to make different cylinder block parts move relatively to the crankcase by a single link mechanism (or cam mechanism). A pair of link mechanisms (or cam mechanisms) becomes necessary for each cylinder block part, so overall two pairs of link mechanisms end up becoming necessary.

To reduce the number of link mechanisms, a variable compression ratio V-type internal combustion engine has been proposed which joins the cylinder blocks of two cylinder groups and makes the joined cylinder block move relatively to the crankcase by a pair of link mechanisms (refer to Japanese Unexamined Patent Publication No. 2005-113743).

DISCLOSURE OF THE INVENTION

In the above-mentioned variable compression ratio V-type internal combustion engine, when making the joined cylinder blocks of the two cylinder groups move relatively to the crankcase so as to change the mechanical compression ratios of the two cylinder groups, a temperature difference and pressure difference sometimes occurs inside the cylinders at top dead center between the two cylinder groups. If the temperature difference and pressure difference are large, a large output difference is caused due to the difference in combustion states between the two cylinder groups. Here, in actuality, the air-fuel mixture inside a cylinder is made to start to ignite and burn before top dead center, but in the present Description, the "temperature" and "pressure" inside of a cylinder at top dead center are estimated values for the case where the air-fuel mixture inside of the cylinder is simply compressed by a piston without being ignited and burned and are values serving as indicators of the combustion state.

Therefore, an object of the present invention is to provide a variable compression ratio V-type internal combustion engine which joins the cylinder blocks of the two cylinder groups and makes the joined cylinder block move relatively to a crankcase wherein the temperature difference and pressure difference inside the cylinders at top dead center between the two cylinder groups can be reduced at the different relative movement positions of the joined cylinder block.

A variable compression ratio V-type internal combustion engine of the present invention is provided, characterized in that the variable compression ratio V-type internal combustion engine joins cylinder blocks of two cylinder groups and make the joined cylinder block move relatively to a crankcase, at each relative movement position of the joined cylinder block, a parameter which enables estimation of a temperature or pressure inside the cylinder at top dead center based on the actual compression ratio is measured for each cylinder group and, at each relative movement position of the joined cylinder block, the intake valve closing timings of the cylinders are controlled so that the temperature or pressure inside the cylinder at top dead center of one cylinder group which was estimated based on the actual compression ratio of the one cylinder group by using the parameter of the one cylinder group and the temperature or pressure inside the cylinders at top dead center of the other cylinder group which was estimated based on the actual compression ratio of the other cylinder group by using the parameter of the other cylinder group become equal.

A variable compression ratio V-type internal combustion engine of the present invention is provided, characterized in that the parameter of the one cylinder group is an intake air amount which was measured in an intake system of the one cylinder group, and the parameter of the other cylinder group is an intake air amount which was measured in an intake system of the other cylinder group.

A variable compression ratio V-type internal combustion engine of the present invention is provided, characterized in that the parameter of the one cylinder group is a temperature inside of the cylinder which was measured in an interval from the intake valve closing to the ignition timing in the one cylinder group, and the parameter of the other cylinder group is a temperature inside of the cylinders which was measured in an interval from the intake valve closing to the ignition timing in the other cylinder group.

A variable compression ratio V-type internal combustion engine of the present invention is provided, characterized in that the parameter of the one cylinder group is a pressure inside of the cylinder which was measured in an interval from the intake valve closing to the ignition timing in the one cylinder group, and the parameter of the other cylinder group is a pressure inside of the cylinder which was measured in an interval from the intake valve closing to the ignition timing in the other cylinder group.

A variable compression ratio V-type internal combustion engine of the present invention is provided, characterized in that the ignition timing is controlled for each cylinder group so that knocking does not continue.

A variable compression ratio V-type internal combustion engine of the present invention is provided, characterized in that the fuel injection timing is controlled for each cylinder group so that knocking does not continue.

According to the variable compression ratio V-type internal combustion engine of the present invention, the variable compression ratio V-type internal combustion engine joins cylinder blocks of two cylinder groups and makes the joined cylinder block move relatively to a crankcase. At each relative movement position of the joined cylinder block, a parameter which enables estimation of a temperature or pressure inside the cylinder at top dead center based on the actual compression ratio is measured for each cylinder group and, at each relative movement position of the joined cylinder block, the intake valve closing timings of the cylinders are controlled so that the temperature or pressure inside the cylinder at top dead center of one cylinder group which was estimated based on the actual compression ratio of the one cylinder group by using the parameter of the one cylinder group and the temperature or pressure inside the cylinder at top dead center of the other cylinder group which was estimated based on the actual compression ratio of the other cylinder group by using the parameter of the other cylinder group become equal. Due to this, the temperature difference and pressure difference inside the cylinders at top dead center between the two cylinder groups which still occur even if eliminating the mismatch of the actual compression ratios of the two cylinder groups are reduced.

According to the variable compression ratio V-type internal combustion engine of the present invention, the parameter of the one cylinder group is an intake air amount which was measured in an intake system of the one cylinder group, and the parameter of the other cylinder group is an intake air amount which was measured in an intake system of the other cylinder group. In this way, the intake valve closing timings of the cylinders are controlled so that the temperature or pressure inside the cylinder at top dead center of the one cylinder group which was estimated based on the actual compression ratio of the one cylinder group using the actual intake air amount of the one cylinder group and the temperature or pressure inside the cylinder at top dead center of the other cylinder group which was estimated based on the actual compression ratio of the other cylinder group using the actual intake air amount of the other cylinder group become equal at each movement position of the joined cylinder block. Due to this, the temperature difference and pressure difference inside the cylinders at top dead center between the two cylinder groups which still occur even if eliminating the mismatch of the actual compression ratios of the two cylinder groups can be reduced.

According to the variable compression ratio V-type internal combustion engine of the present invention, the parameter of the one cylinder group is a temperature inside of the cylinder which was measured in an interval from the intake valve closing to the ignition timing in the one cylinder group, and the parameter of the other cylinder group is a temperature inside of the cylinder which was measured in an interval from the intake valve closing to the ignition timing in the other cylinder group. In this way, the intake valve closing timings of the cylinders are controlled so that the temperature inside the cylinder at top dead center of the one cylinder group which was estimated based on the actual compression ratio of the one cylinder group using the actual temperature inside the cylinder in the interval from the intake valve closing to the ignition timing of the one cylinder group and the temperature inside the cylinder at top dead center of the other cylinder group which was estimated based on the actual compression ratio of the other cylinder group using the actual temperature inside the cylinder in the interval from the intake valve closing to the ignition timing of the other cylinder group become equal at each movement position of the joined cylinder block. Due to this, the temperature difference and pressure difference inside the cylinders at top dead center between the two cylinder groups which still occur even if eliminating the mismatch of the actual compression ratios of the two cylinder groups can be reduced.

According to the variable compression ratio V-type internal combustion engine of the present invention, the parameter of the one cylinder group is a pressure inside of the cylinder which was measured in an interval from the intake valve closing to the ignition timing in the one cylinder group, and the parameter of the other cylinder group is a pressure inside of the cylinder which was measured in an interval from the intake valve closing to the ignition timing in the other cylinder group. In this way, the intake valve closing timings of the cylinders are controlled so that the pressure inside the cylinder at top dead center of the one cylinder group which was estimated based on the actual compression ratio of the one cylinder group using the actual pressure inside the cylinder in the interval from the intake valve closing to the ignition timing of the one cylinder group and the pressure inside the cylinder at top dead center of the other cylinder group which was estimated based on the actual compression ratio of the other cylinder group using the actual pressure inside the cylinder in the interval from the intake valve closing to the ignition timing of the other cylinder group become equal at each movement position of the joined cylinder block. Due to this, the temperature difference and pressure difference inside the cylinders at top dead center between the two cylinder groups which still occur even if eliminating the mismatch of the actual compression ratios of the two cylinder groups can be reduced.

According to the variable compression ratio V-type internal combustion engine of the present invention, the ignition timing is controlled for each cylinder group so that knocking does not continue. Due to this, when knocking occurs in either of the cylinder groups even if reducing the temperature difference and pressure difference in the cylinders at top dead center between the two cylinder groups, it is possible to control the ignition timing to prevent continuation of knocking.

The variable compression ratio V-type internal combustion engine of the present invention, the fuel injection timing is controlled for each cylinder group so that knocking does not continue. Due to this, when knocking occurs in either of the cylinder groups even if reducing the temperature difference and pressure difference in the cylinders at top dead center between the two cylinder groups, it is possible to control the fuel injection timing to prevent continuation of knocking.

DESCRIPTION OF EMBODIMENTS

Figure 1:
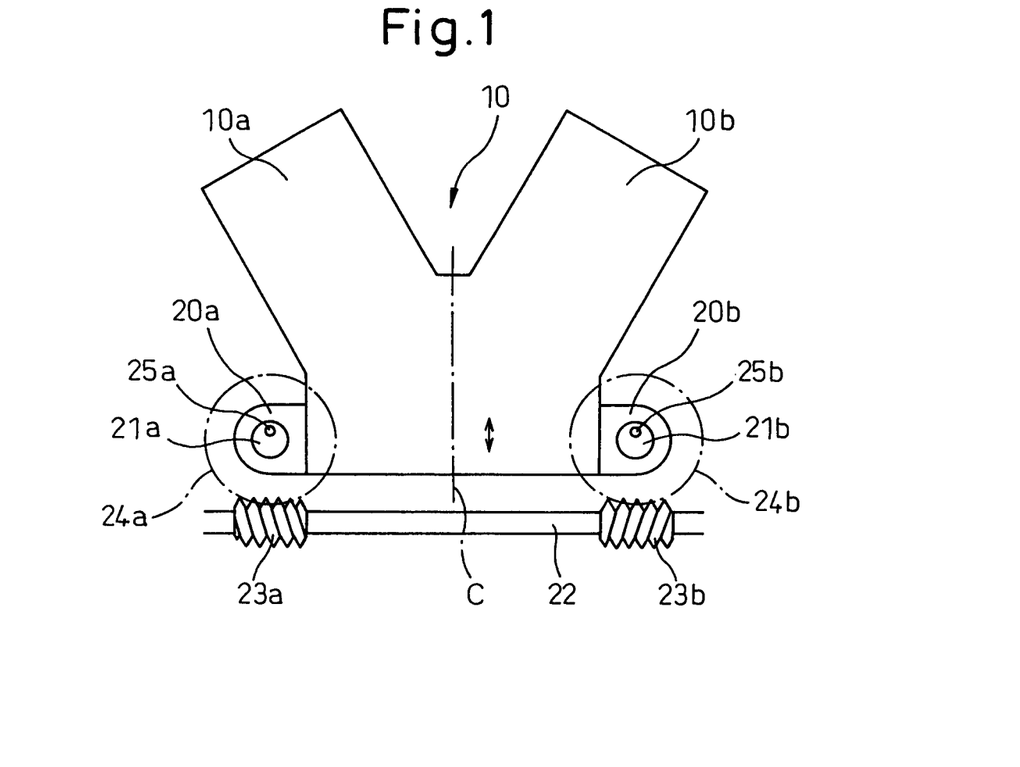
FIG. 1 is a view for explaining a relative movement mechanism of a cylinder block of a variable compression ratio V-type internal combustion engine according to the present invention.

FIG. 1 is a view which explains a relative movement mechanism of a cylinder block of a variable compression ratio V-type internal combustion engine according to the present invention. In the figure, 10 indicates a cylinder block. The cylinder block 10 is comprised of a first cylinder group side part 10a and a second cylinder group side part 10b which are formed integrally.

This V-type internal combustion engine is a spark ignition type. The first cylinder group side part 10a and the second cylinder group side part 10b of the cylinder block 10 are mounted with cylinder heads. At the cylinder heads, spark plugs are provided for the cylinders. At each cylinder head, intake ports and exhaust ports are formed. Each intake port is communicated through an intake valve to a cylinder, while each exhaust port is communicated through an exhaust valve to a cylinder. For each cylinder head, an intake manifold and exhaust manifold are connected. The intake manifolds open to the atmosphere via an air cleaner either independently of each other or by merging, while the exhaust manifolds are also open to the atmosphere via a catalyst device either independently of each other or by merging. The intake system of the first cylinder group is provided with a first air flow meter for measuring the amount of intake air to the cylinders of the first cylinder group, while the intake system of the second cylinder group is provided with a second air flow meter for measuring the amount of intake air to the cylinders of the second cylinder group. Further, the V-type internal combustion engine may be a diesel engine as well.

In general, the lower the engine load, the worse the heat efficiency, so at the time of low engine load operation, if raising the mechanical compression ratio to raise the expansion ratio, it is possible to improve the heat efficiency due to the work time of the pistons in the expansion stroke becoming longer. The mechanical compression ratio becomes the ratio (V1+V2)/V1 of the sum of the cylinder volume V1 at the top dead center crank angle and the stroke volume V2 with respect to the cylinder volume V1 at the top dead center crank angle and is equal to the expansion ratio of the expansion stroke. Due to this, the V-type internal combustion engine makes the cylinder block 10 move relative to the crankcase (not shown) and makes the distance between the cylinder block 10 and the engine crankshaft (not shown) change so as to make the mechanical compression ratios of the first cylinder group and the second cylinder group variable. For example, the mechanical compression ratio is controlled so that the lower the engine load, the higher the mechanical compression ratio is made. Further, if raising the mechanical compression ratio, knocking easily occurs, so it is also possible to raise the mechanical compression ratio at the time of low engine load operation when knocking is difficult to occur so as to be higher than that at the time of high engine load.

As shown in FIG. 1, the cylinder block 10 is provided with a first support 20a at the bottom part of the side surface of the first cylinder group side part 10a and is provided with a second support 20b at the bottom part of the side surface of the second cylinder group side part 10b. The first support 20a supports a first boss 21a which has an eccentric hole so as to be able to rotate about an axis extending in a direction parallel to the engine crankshaft, while the second support 20b supports a second boss 21b which has an eccentric hole so as to be able to rotate about an axis extending in a direction parallel to the engine crankshaft. The first boss 21a and the second boss 21b are made the same shape.

At a drive shaft 22 which extends in a direction perpendicular to the engine crankshaft, a first worm gear 23a and a second worm gear 23b are provided. The first gear 24a engages with the first worm gear 23a, while the second gear 24b engages with the second worm gear 23b. The first gear 24a is fastened to a first crankshaft. A crank part 25a of the first crankshaft is arranged in the eccentric hole of the first boss 21a. Further, the second gear 24b is fastened to a second crankshaft. A crank part 25b of the second crankshaft is arranged in the eccentric hole of the second boss 21b.

Due to rotation of the drive shaft 22, the first worm gear 23a and second worm gear 23b respectively make the first gear 24a and the second gear 24b turn in the opposite directions. Due to this, through the first crankshaft and second crankshaft, the first boss 21a and the second boss 21b are made to turn in opposite directions. In this way, as shown by the arrow, it is possible to make the cylinder block 10 move relatively along the center axial line C of the cylinder block in the vertical direction with respect to the crankcase. By controlling the rotational times of the drive shaft 22, it is possible to set the cylinder block at different relative movement positions.

Figure 2:
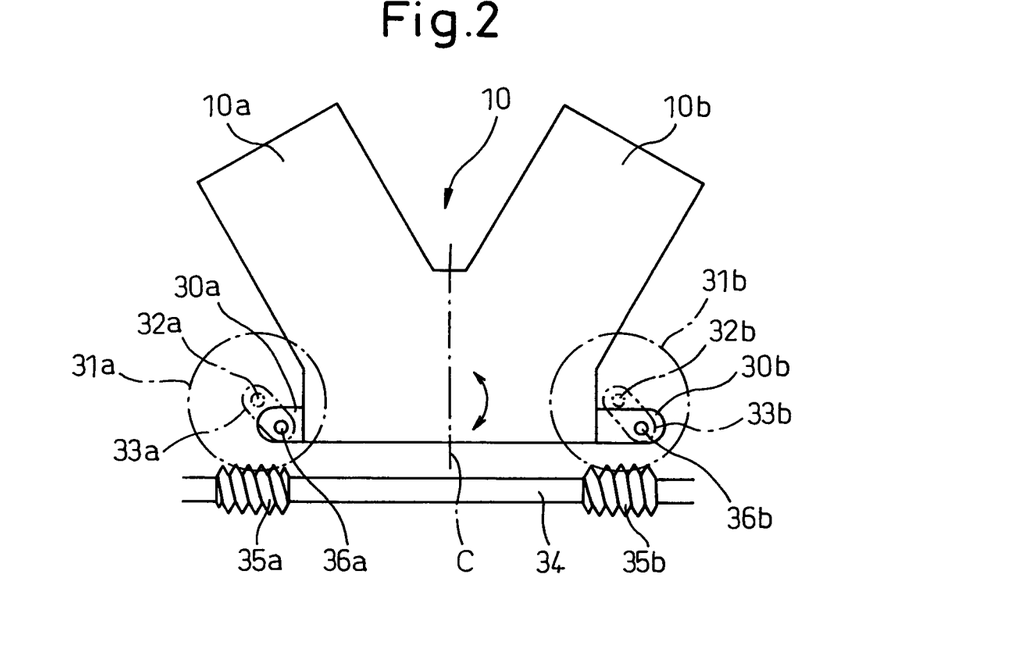
FIG. 2 is a view for explaining another relative movement mechanism of a cylinder block of a variable compression ratio V-type internal combustion engine according to the present invention.

FIG. 2 is a view which explains another relative movement mechanism of a cylinder block of a variable compression ratio V-type internal combustion engine according to the present invention. As shown in this figure, the cylinder block 10 is provided with a first support 30a at the bottom part of the side surface of the first cylinder group side part 10a and with a second support 30b at the bottom part of the side surface of the second cylinder group side part 10b. The first support 30a is coupled through a first connecting shaft 36a to a first arm 33a which is fastened to a shaft 32a of a first gear 31a, while the second support 30b is coupled with a second connecting shaft 36b to a second arm 33b which is fastened to a shaft 32b of a second gear 31b.

A drive shaft 34, which extends in a direction perpendicular to the engine crankshaft, is provided with a first worm gear 35a and a second worm gear 35b. The first worm gear 35a engages with the first gear 31a, while the second worm gear 35b engages with the second gear 31b.

Due to rotation of the drive shaft 34, the first worm gear 35a and second worm gear 35b respectively make the first gear 31a and the second gear 31b turn in the same direction (in FIG. 1, counterclockwise direction). Due to this, through the shafts 32a and 32b, the first arm 33a and the second arm 33b are made to swing in the same direction. In this way, as shown by the arrow, it is possible to make the cylinder block 10 move along the movement paths of the first connecting shaft 36a and second connecting shaft 36b in the horizontal direction while making it move in the vertical direction relative to the crankcase. By controlling the rotational times of the drive shaft 34, it is possible to set the cylinder block at different relative movement positions.

Figure 3:
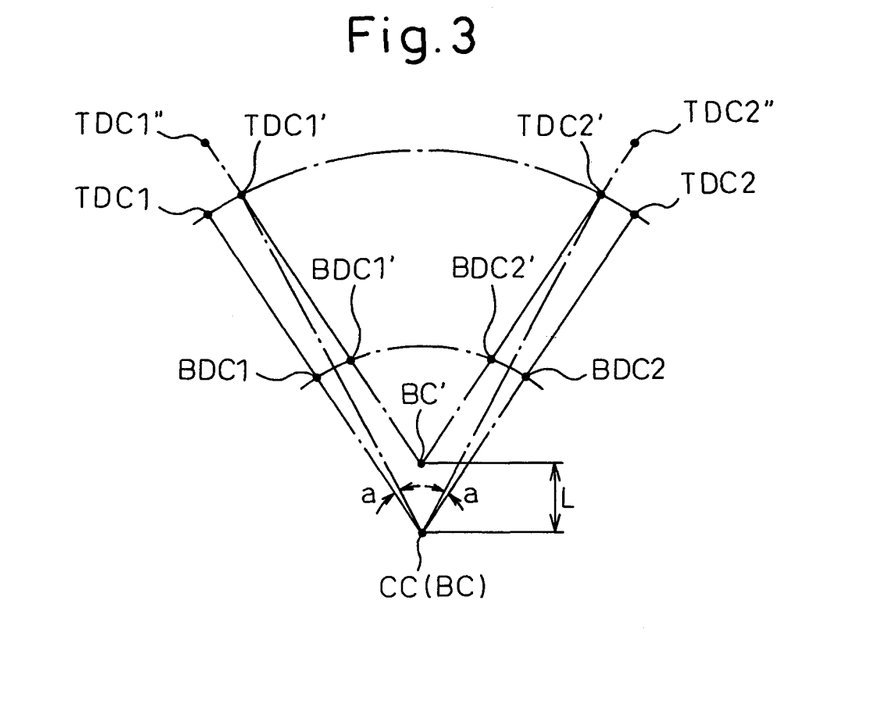
FIG. 3 is a view for explaining a change in mechanical compression ratios in the relative movement mechanism of FIG. 1.

FIG. 3 is a view which explains a change in the mechanical compression ratio in the relative movement mechanism of FIG. 1. In the figure, CC is the engine crankshaft center, TDC1 and BDC1 are the top dead center position and bottom dead center position of the piston pin of a cylinder of the first cylinder group at the lowest position of the cylinder block, and TDC2 and BDC2 are the top dead center position and bottom dead center position of the piston pin of a cylinder of the second cylinder group at the lowest position of the cylinder block. In the present embodiment, the front view intersecting point BC of the cylinder centerline of the first cylinder group and the cylinder centerline of the second cylinder group matches the engine crankshaft center CC at the lowest position of the cylinder block. If using the relative movement mechanism of FIG. 1 to make the cylinder block move in the top direction by exactly the distance L, the front view intersecting point becomes BC', the top dead center position and bottom dead center position of the piston pin of the cylinder of the first cylinder group respectively become TDC1' and BDC1', and the top dead center position and bottom dead center position of the piston pin of the cylinder of the second cylinder group respectively become TDC2' and BDC2'. TDC1" is the imaginary top dead center position of the piston pin of the cylinder of the first cylinder group in the case of moving the engine crankshaft also together with the cylinder block, while TDC2" is the imaginary top dead center position of the piston pin of the cylinder of the second cylinder group in the case of moving the engine crankshaft also together with the cylinder block.

In this way, due to movement of the cylinder block in the top direction, at the first cylinder group and second cylinder group, the positions of the piston pins at top dead center descend from TDC1" and TDC2" to TDC1' and TDC2', the cylinder volumes at the top dead center crank angle become larger, and therefore the mechanical compression ratios become smaller.

Figure 4:
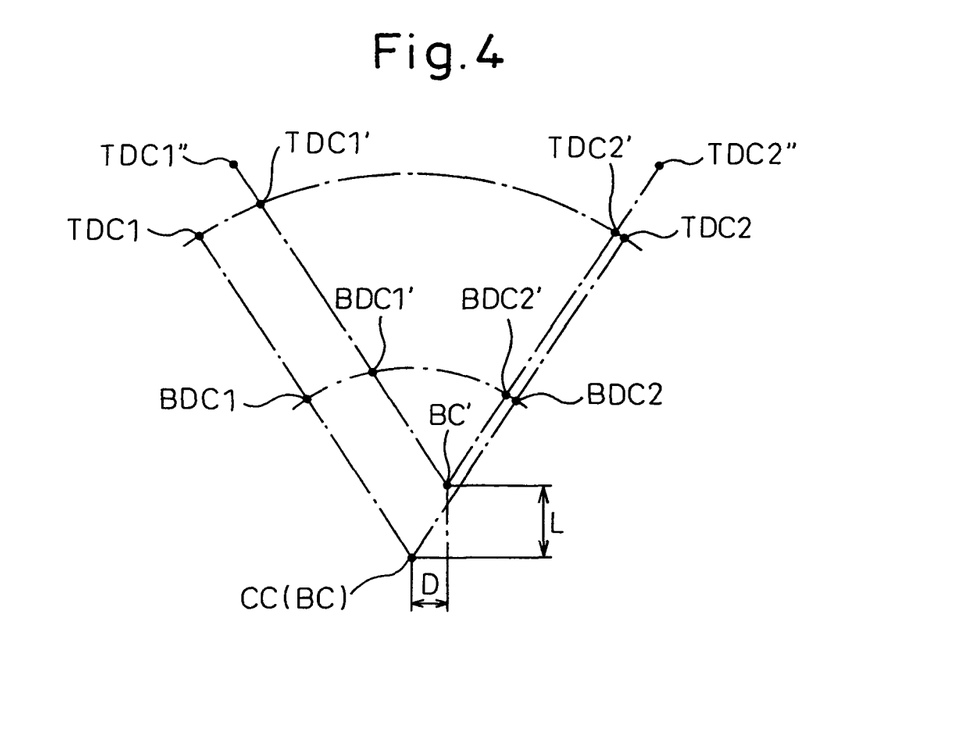
FIG. 4 is a view for explaining a change in mechanical compression ratios in the relative movement mechanism of FIG. 2.

FIG. 4 is a view which explains a change in the mechanical compression ratio in the relative movement mechanism of FIG. 2. In the figure, the same reference signs show the same components as in FIG. 3. The relative movement mechanism of FIG. 2 makes the cylinder block move in the top direction by exactly the distance L and simultaneously makes it move in the right direction by exactly the distance D. Due to such movement of the cylinder block, at the first cylinder group and the second cylinder group, the positions of the piston pins at top dead center descend from TDC1" and TDC2" to respectively TDC1' and TDC2' and the cylinder volumes at top dead center crank angle become larger, so the mechanical compression ratios become smaller. Here, due to movement of the cylinder block in the horizontal direction to the second cylinder group direction, as shown in FIG. 4, the piston pin position at top dead center at the second cylinder group descend further than the piston pin position at top dead center in the first cylinder group, so the mechanical compression ratio of the second cylinder group becomes smaller than the mechanical compression ratio of the first cylinder group.

In this regard, the strict compression ratio, which considers the intake air amount, is closer than the mechanical compression ratio to the ratio (V3/V1) of the cylinder volume V3 at the time of intake valve closing and the cylinder volume V1 at top dead center crank angle. This ratio is called the "actual compression ratio". It is preferable that, at the different relative positions of the cylinder block, the actual compression ratios of the first cylinder group and second cylinder group be made equal to prevent a difference from arising between the temperature and pressure in the cylinders at top dead center between the first cylinder group and the second cylinder group (estimated values for case where air-fuel mixture in cylinders do not ignite and burn and indicators of combustion state) and to prevent knocking from occurring at only one cylinder group and output difference from occurring between the two cylinder groups.

As explained in FIG. 4, if using the relative movement mechanism which is shown in FIG. 2 to make the cylinder block move relative to the crankcase, the mechanical compression ratio of the first cylinder group and the mechanical compression ratio of the second cylinder group will not become equal and, with that as is, the actual compression ratios will also not become equal. Further, even if using the relative movement mechanism which is shown in FIG. 1 to make the cylinder block move relative to the crankcase, as shown in FIG. 3, after movement of the cylinder block in the top direction, at the first cylinder group, the top dead center crank angle is retarded by exactly the crank angle "a" compared with before movement, while at the second cylinder group, the top dead center crank angle is advanced by exactly the crank angle "a" compared with before movement. In this way, there is a overall tendency toward retardation in the first cylinder group and an overall tendency toward advance in the second cylinder group, so again, with that as it is, the actual compression ratio of the first cylinder group and the actual compression ratio of the second cylinder group will not become equal. Such an overall tendency of retardation of the first cylinder group and an overall tendency of advance of the second cylinder group, as will be understood from FIG. 4, also exist in the case of using the relative movement mechanism which is shown in FIG. 2 to make the cylinder block relatively move.

Figure 5:
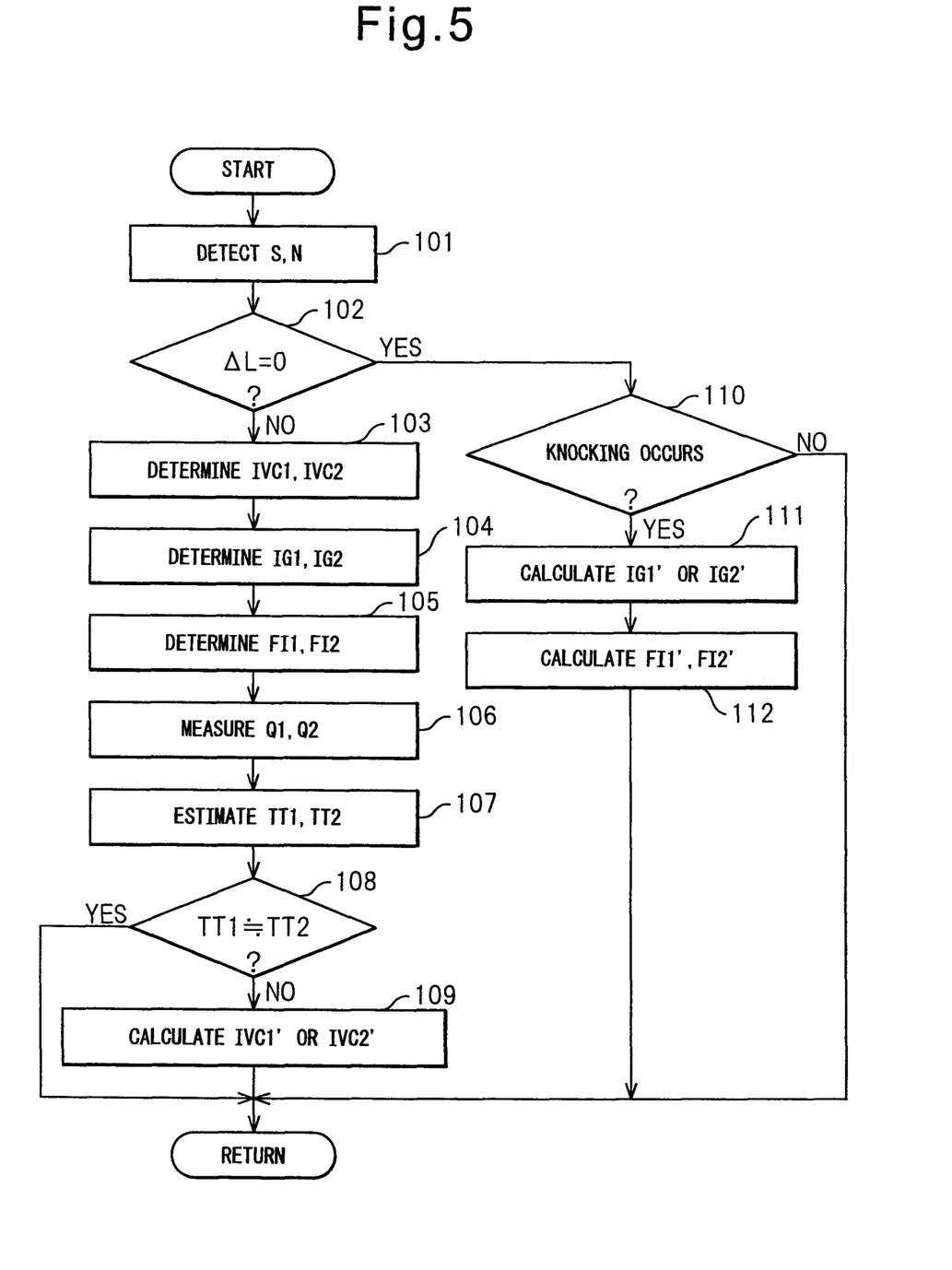
FIG. 5 is a flowchart for explaining control of a variable compression ratio V-type internal combustion engine according to the present invention.

The variable compression ratio V-type internal combustion engine of the present embodiment has a valve timing mechanism which can change at least the closing timings of the intake valves. By the control of the flowchart which is shown in FIG. 5, the temperature difference and pressure difference in the cylinders at top dead center between the first cylinder group and the second cylinder group are made smaller. As the valve timing mechanism, any valve timing mechanism which can change the closing timings of the intake valves can be used. For example, a mechanism which can change the phase of a cam shaft, a mechanism which can make a cam shaft move in the axial line direction and thereby change the shape of a cam opening and close the intake valve, a mechanism which uses a hydraulic type or other actuator to open and close an intake valve, etc. may be used.

First, at step 101, an amount of depression S of an accelerator pedal is detected as the engine load by an accelerator pedal sensor etc. and an engine speed N is detected by an engine speed sensor. At step 102, a position P of the cylinder block which realizes an optimum mechanical compression ratio for the current engine operating state based on the engine load S and the engine speed N is determined using a predetermined map etc. It is judged if a movement distance $\Delta L$ from the current position for making the cylinder block this position P is zero.

When this judgment is negative, that is, when making the cylinder block move, at step 103, the closing timing IVC1 of the intake valve at the first cylinder group and the closing timing IVC2 of the intake valve at the second cylinder group are determined so that the actual compression ratio of the first cylinder group and the actual compression ratio of the second cylinder group become equal at the new position of the cylinder block after making the cylinder block move by exactly $\Delta L$.

When using the relative movement mechanism which is shown in FIG. 1 to make the cylinder block move, for example, as shown in FIG. 3, when the position of movement from the lowest position by exactly the distance L in the top direction is the position P which realizes the optimum mechanical compression ratio, the closing timing IVC1 of the intake valve of the first cylinder group is made the retarded side from the closing timing IVC2 of the intake valve of the second cylinder group. In this way, the actual compression ratios of the first cylinder group and second cylinder group are made the optimal actual compression ratio for the current engine operating state.

Further, when the relative movement mechanism which is shown in FIG. 2 is used to make the cylinder block move, for example, as shown in FIG. 4, when the position of movement from the lowest position by exactly the distance L in the top direction is the position P which realizes the optimum mechanical compression ratio, the cylinder volume $V1_{1p}$ at top dead center crank angle of the first cylinder group becomes smaller than the cylinder volume $V1_{2p}$ at top dead center crank angle of the second cylinder group, so to make the actual compression ratios equal, the cylinder volume $V3_{1p}$ at the time of intake valve closing of the first cylinder group is made smaller than the cylinder volume $V3_{2p}$ at the time of intake valve closing of the second cylinder group and to obtain $V3_{1p}/V1_{1p}=V3_{2p}/V1_{2p}$, the closing timing IVC1 of the intake valve of the first cylinder group is made the retarded side from the closing timing IVC2 of the intake valve of the second cylinder group. In this way, the actual compression ratios of the first cylinder group and second cylinder group are made the optimum actual compression ratio for the current engine operating state.

Next, at step 104, the optimum ignition timings IG1 and IG2 (for example, MBT) of the first cylinder group and second cylinder group for the current engine operating state are determined using a predetermined map etc. Here, IG1 is the same crank angles before compression top dead center in the first cylinder group. IG2 is the same crank angle before compression top dead center in the second cylinder group. Next, at step 105, the optimum fuel injection timings FI1 and FI2 of the first cylinder group and second cylinder group for the current engine operating state are determined using a predetermined map etc. Here, FI1 is the same crank angles after suction top dead center in the first cylinder group. FI2 is the same crank angles after suction top dead center in the second cylinder group. When the internal combustion engine is a direct fuel injection type spark ignition internal combustion engine or intake synchronized port fuel injection type spark ignition internal combustion engine, at the intake stroke fuel injection, the more advanced the fuel injection timing, the easier it is for the injected fuel to vaporize before ignition and the more advantageous it is for realizing a good combustion state. Further, the more retarded the fuel injection timing, the more the temperature inside the cylinder can be reduced by the latent heat of vaporization of the fuel and the more advantageous it is for suppressing knocking. Next, at step 106, the intake air amount Q1 of the first cylinder group and the intake air amount Q2 of the second cylinder group are measured.

In this way, fuel is injected at the first cylinder group and second cylinder group at the optimum fuel injection timings FI1 and FI2, the intake valve of the first cylinder group is closed at the intake valve closing timing IVC1, the intake valve of the second cylinder group is closed at the intake valve closing timing IVC2, and the ignition is performed at the first cylinder group and second cylinder group at the optimum ignition timings IG1 and IG2.

Due to this, at the first cylinder group and second cylinder group, combustion is realized in the same actual compression ratio, the temperature difference and pressure difference of the cylinders at top dead center between the first cylinder group and second cylinder group are made smaller, and the combustion state of the first cylinder group and the combustion state of the second cylinder group can be made almost equal.

Next, at step 107, the intake air amounts Q1 and Q2 of the first cylinder group and second cylinder group which were measured at step 106 and the actual compression ratio of the first cylinder group and the actual compression ratio of the second cylinder group are used as the basis to estimate the temperatures inside the cylinders TT1 and TT2 at top dead center of the first cylinder group and second cylinder group by using for example a predetermined map. The temperature inside the cylinder at top dead center becomes higher the larger the intake air amount and becomes higher the larger the actual compression ratio.

Next, at step 108, it is judged if the temperature inside the cylinder TT1 at top dead center of the first cylinder group and the temperature inside the cylinder TT2 at top dead center of the second cylinder group are almost equal. When this judgment is positive, there is no need to change the closing timing IVC1 of the intake valve of the first cylinder group and the closing timing IVC2 of the intake valve of the second cylinder group which were determined at step 103, so the routine is ended. However, when the judgment at step 108 is negative, the combustion state of the first cylinder group and the combustion state of the second cylinder group are made further closer by calculating a new intake valve closing timing IVC1' of the first cylinder group or a new intake valve closing timing IVC2' of the second cylinder group necessary for making the lower temperature inside the cylinder of the cylinder group match the higher temperature inside the cylinder of the cylinder group and, at the next cycle, closing the intake value of the first cylinder group or the second cylinder group at the calculated new intake valve closing timing IVC1' or IVC2'. Here, preferably, the fact that a change of the intake valve closing timing also causes a change of the actual compression ratio is considered.

Here, in the internal combustion engine which has the relative movement mechanism which is shown in FIGS. 1 and 3, since the cylinder volume $V1_1$ at top dead center crank angle of the first cylinder group and the cylinder volume $V1_2$ at top dead center crank angle of the second cylinder group are equal, due to the determination of the intake valve closing timing at step 103, the cylinder volume $V3_1$ at the intake valve closing crank angle of the first cylinder group and the cylinder volume $V3_2$ at the intake valve closing timing of the second cylinder group are made equal. In this way, the actual compression ratio of the first cylinder group and the actual compression ratio of the second cylinder group are made equal. If, despite this, the judgment at step 108 is negative, it may be that at the cylinder group with the low estimated temperature inside the cylinder, the intake air amount is smaller than intended. Due to this, the closing timing of the intake valve of this cylinder group is made to change to increase the intake air amount. The closing timing of the intake valve may be retarded to make the intake air amount increase and may be advanced to make the intake air amount increase. In this internal combustion engine, the cylinder volume $V1_1$ at top dead center crank angle of the first cylinder group and the cylinder volume $V1_2$ at top dead center crank angle of the second cylinder group are equal, so in each engine operating state, the intended intake air amount of the first cylinder group is the same as the intended intake air amount of the second cylinder group.

Further, in the internal combustion engine which has the relative movement mechanism which is shown in FIGS. 2 and 4, the cylinder volume $V1_1$ at the top dead center crank angle of the first cylinder group is smaller than the cylinder volume $V1_2$ at the top dead center crank angle of the second cylinder group, so due to the determination of the intake valve closing timing of step 103, the cylinder volume $V3_1$ at the intake valve closing crank angle of the first cylinder group is made smaller than the cylinder volume $V3_2$ at the intake valve closing timing of the second cylinder group. In this way, the actual compression ratio of the first cylinder group and the actual compression ratio of the second cylinder group are made equal. If, despite this, the judgment at step 108 is negative, it may be that at the cylinder group with the low estimated temperature inside the cylinder, the intake air amount is smaller than intended. Due to this, the closing timing of the intake valve of this cylinder group is made to change to increase the intake air amount. In the present internal combustion engine, when the cylinder volume $V1_1$ at top dead center crank angle of the first cylinder group is smaller than the cylinder volume $V1_2$ at top dead center crank angle of the second cylinder group, at each engine operating state, the intended intake air amount of the second cylinder group becomes greater than the intended intake air amount of the first cylinder group.

In this way, it is possible to further reduce the temperature difference and pressure difference inside of the cylinders at top dead center between the first cylinder group and second cylinder group and possible to make the combustion state of the first cylinder group and the combustion state of the second cylinder group further closer.

At the time of the steady state, the judgment at step 102 is positive and this engine operation is repeated. If the knocking sensor etc. detects knocking at one cylinder group, the judgment at step 110 is positive then, at step 111, the ignition timing IG1 or IG2 of the first cylinder group or second cylinder group where knocking occurred is changed to the new retarded side ignition timing IG1' or IG2' to suppress the continuation of knocking, further, at step 112, the fuel injection timing FI1 or FI2 of the first cylinder group or second cylinder group where knocking occurred is changed to the new regarded side fuel injection timing FI1' or FI2' to suppress the continuation of knocking.

In this flowchart, at step 107, the temperature inside the cylinder TT1 at top dead center of the first cylinder group and the temperature inside the cylinder TT2 at top dead center of the second cylinder group were estimated, then, at step 108, these temperatures inside the cylinders TT1 and TT2 were compared, but the pressure inside the cylinder at top dead center also is an indicator of the combustion state, so at step 107, it is also possible to use the intake air amount Q1 of the first cylinder group and the actual compression ratio of the first cylinder group as the basis to estimate the pressure inside the cylinder TP1 at top dead center of the first cylinder group by using a predetermined map etc. and to use the intake air amount Q2 of the second cylinder group and the actual compression ratio of the second cylinder group as the basis to estimate the pressure inside the cylinder TP2 at top dead center of the second cylinder group by using a predetermined map etc. and, at step 108, to change the intake valve closing timing of the first cylinder group or the second cylinder group so that the estimated pressure inside the cylinder TP1 of the first cylinder group and the estimated pressure inside the cylinder TP2 of the second cylinder group become equal. The pressure inside the cylinder at top dead center also becomes higher the greater the intake air amount and becomes higher the greater the actual compression ratio.

Further, in the present flowchart, as the parameters enabling estimation of the temperature or pressure inside the cylinder at top dead center based on the actual compression ratio, used as indicators of the combustion state at the different relative movement positions of the cylinder block, the intake air amounts Q1 and Q2 of the first cylinder group and second cylinder group were measured. However, it is also possible to use as a parameter the temperature inside the cylinder which was measured at any crank angle between the intake valve closing and the ignition timing. That is, if, at step 106, measuring the temperature inside the cylinder of the first cylinder group at any crank angle in the interval from the intake valve closing to the ignition timing of the first cylinder group and measuring the temperature inside the cylinder of the second cylinder group at any crank angle (preferably made same as crank angle at time of measurement of temperature of cylinder of first cylinder group) in the interval from the intake valve closing to the ignition timing of the second cylinder group and, at step 107, using the measured temperature inside the cylinder of the first cylinder group, the crank angle at the time of measurement, and the actual compression ratio of the first cylinder group as the basis to estimate the temperature TT1 inside of the cylinder at top dead center of the first cylinder group using a predetermined map etc. and using the measured temperature inside of the cylinder of the second cylinder group, the crank angle at the time of measurement, and the actual compression ratio of the second cylinder group as the basis to estimate the temperature TT2 inside of the cylinder at top dead center of the second cylinder group using a predetermined map etc., at step 109, it is possible to change the intake valve closing timing of the first cylinder group or second cylinder group so that the estimated temperature TT1 inside the cylinder at top dead center of the first cylinder group and the estimated temperature TT2 inside the cylinder at top dead center of the second cylinder group become equal. The temperature inside the cylinder at top dead center becomes higher the higher the measurement temperature and becomes higher the higher the actual compression ratio.

Further, as a parameter, it is also possible to use the pressure inside of the cylinder measured at any crank angle from the intake valve closing to the ignition timing. That is, if, at step 106, measuring the pressure inside the cylinder of the first cylinder group at any crank angle in the interval from the intake valve closing to the ignition timing of the first cylinder group and measuring the pressure inside the cylinder of the second cylinder group at any crank angle (preferably made same as crank angle at time of measurement of pressure of cylinder of first cylinder group) in the interval from the intake valve closing to the ignition timing of the second cylinder group and, at step 107, using the measured pressure inside the cylinder of the first cylinder group, the crank angle at the time of measurement, and the actual compression ratio of the first cylinder group as the basis to estimate the pressure TP1 inside of the cylinder at top dead center of the first cylinder group using a predetermined map etc. and using the measured pressure inside of the cylinder of the second cylinder group, the crank angle at the time of measurement, and the actual compression ratio of the second cylinder group as the basis to estimate the pressure TP2 inside of the cylinder at top dead center of the second cylinder group using a predetermined map etc., at step 109, it is possible to change the intake valve closing timing of the first cylinder group or second cylinder group so that the estimated pressure TP1 inside the cylinder at top dead center of the first cylinder group and the estimated pressure TP2 inside the cylinder at top dead center of the second cylinder group become equal. The pressure inside the cylinder at top dead center becomes higher the higher the measurement pressure and becomes higher the larger the actual compression ratio.

REFERENCE SIGNS LIST

10 cylinder block
10*a* first cylinder group side part
10*b* second cylinder group side part

The invention claimed is:
1. A variable compression ratio V-type internal combustion engine with a joined cylinder block of two cylinder groups that makes the joined cylinder block move relatively to a crankcase, comprising:
 a control unit configured to measure, for each cylinder group at each relative movement position of the joined cylinder block, a parameter which enables estimation of a temperature or pressure inside the cylinder at top dead center based on the actual compression ratio, and to control the intake valve closing timings of the cylinders so that the temperature or pressure inside the cylinder at top dead center of one cylinder group which was esti- mated based on the actual compression ratio of the one cylinder group by using said parameter of the one cylinder group and the temperature or pressure inside the cylinder at top dead center of the other cylinder group which was estimated based on the actual compression ratio of the other cylinder group by using said parameter of the other cylinder group become equal.

2. A variable compression ratio V-type internal combustion engine according to claim 1, wherein the control unit is configured to measure an intake air amount in an intake system of the one cylinder group as the parameter the one cylinder group, and to measure an intake air amount in an intake system of the other cylinder group as the parameter of the other cylinder group.

3. A variable compression ratio V-type internal combustion engine according to claim 1, wherein the control unit is configured to measure a temperature inside of the cylinder at any timing in an interval from the intake valve closing to the ignition timing in the one cylinder group as the parameter of the one cylinder group, and to measure a temperature inside of the cylinder at any timing in an interval from the intake valve closing to the ignition timing in the other cylinder group as the parameter of the other cylinder group.

4. A variable compression ratio V-type internal combustion engine according to claim 1, wherein the control unit is configured to measure a pressure inside of the cylinder at any timing in an interval from the intake valve closing to the ignition timing in the one cylinder group as the parameter of the one cylinder group, and to measure a pressure inside of the cylinder at any timing in an interval from the intake valve closing to the ignition timing in the other cylinder group as the parameter of the other cylinder group.

5. A variable compression ratio V-type internal combustion engine according to claim 1, wherein control unit is configured to control the ignition timing for each cylinder group so that knocking does not continue.

6. A variable compression ratio V-type internal combustion engine according to claim 1, wherein the control unit is configured to control the fuel injection timing for each cylinder group so that knocking does not continue.

\* \* \* \* \*